United States Patent [19]

Smith et al.

[11] 3,820,093

[45] June 25, 1974

[54] METHOD AND MEANS FOR REDUCING DOMAIN PINNING IN MAGNETIC WALL DOMAIN DEVICES

[75] Inventors: Alan B. Smith, Lincoln; Warren W. Goller, Maynard, both of Mass.

[73] Assignee: Sperry Rand Corporation, New York, N.Y.

[22] Filed: Feb. 20, 1973

[21] Appl. No.: 333,605

[52] U.S. Cl. ...................... 340/174 TF, 340/174 SR
[51] Int. Cl. ......................... G11c 11/14, G11c 19/00
[58] Field of Search ................. 340/174 TF, 174 SR

[56] References Cited

UNITED STATES PATENTS

| | | | |
|---|---|---|---|
| 3,540,019 | 11/1970 | Bobeck et al. | 340/174 TF |
| 3,540,021 | 11/1970 | Bobeck et al. | 340/174 TF |
| 3,678,479 | 7/1972 | Owens | 340/174 TF |
| 3,753,814 | 8/1973 | Pulliam et al. | 340/174 TF |

OTHER PUBLICATIONS

Journal of Applied Physics, "Films and Domains" by Josephs; Vol. 42; No. 4; 3/15/71; pages 1,802–1,803.

*Primary Examiner*—Stanley M. Urynowicz, Jr.
*Attorney, Agent, or Firm*—Howard P. Terry

[57] ABSTRACT

An alternating magnetic field applied preferably perpendicularly to the magnetic layer of a magnetic wall domain device reduces the domain pinning effect of defects in the magnetic layer thereby apparently reducing the coercivity of the magnetic material.

10 Claims, 1 Drawing Figure

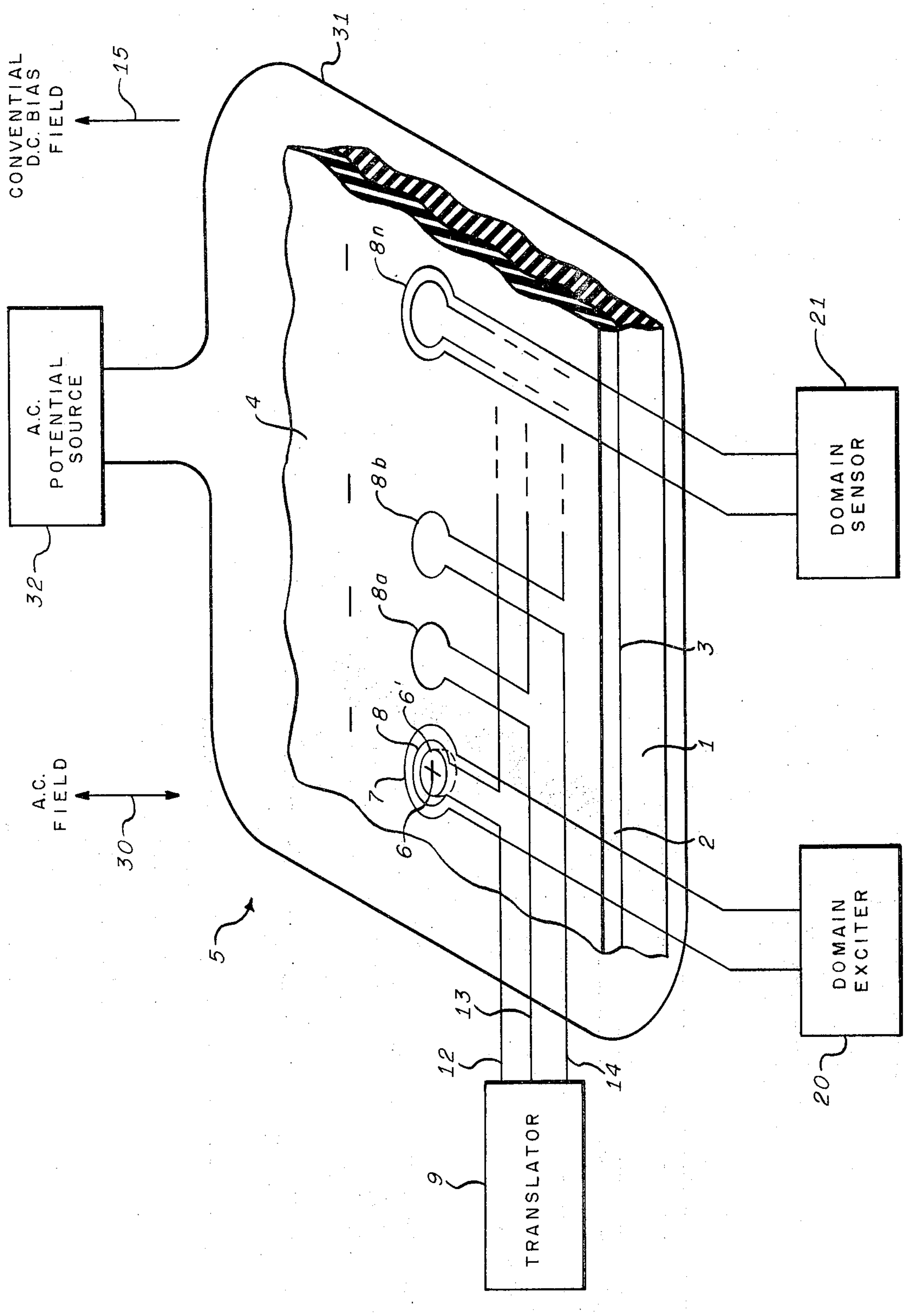
CONVENTIAL D.C. BIAS FIELD
A.C. POTENTIAL SOURCE
A.C. FIELD
DOMAIN SENSOR
DOMAIN EXCITER
TRANSLATOR

METHOD AND MEANS FOR REDUCING DOMAIN PINNING IN MAGNETIC WALL DOMAIN DEVICES

BACKGROUND OF THE INVENTION

1. Field of the Invention

The invention relates to magnetic wall domain devices, otherwise known as magnetic bubble domain devices, and is particularly directed to reducing domain pinning caused by defects in the magnetic layer.

2. Description of the Prior Art

Magnetic domains of generally cylindrical character have been formed in isolated state in relatively thin plates of magnetic materials, such as garnets, and have been manipulated to perform the functions required in digital processors such as storage, logic and data transfer operations. These domains are variously known in the art as magnetic wall domains, single wall domains, magnetic bubble domains and the like. The cylindrical domains behave as isolated volumes in which the magnetic polarization of the magnetic material therewithin is reversed with respect to the direction of magnetization of the remainder of the material, the magnetization vectors preferably being oriented perpendicularly to the plane of the plate.

Means for generating, sustaining, propagating and detecting the domains are well known in the art. Reference may be had, for example, in *The Bell System Technical Journal*, Vol. XLVI, No. 8, 1967, to pages 1901–1925 containing the paper entitled "Properties and Device Applications of Magnetic Domains in Orthoferrites." Reference may also be had to the following copending patent applications, assigned to the assignee of the present invention: U.S. Pat. Ser. No. 296,412 filed Oct. 10, 1972 in the name of Michael Kestigian for "Magnetic Devices" and U.S. Pat. Ser. No. 390,862 filed Nov. 27, 1972 in the name of Michael Kestigian for "Magnetic Device and Method."

As is well known, the domains may be generated by a magnetic loop located on the surface of the magnetic layer and may be detected by sensing loops similarly located. Once generated, domains may be stably sustained in a layer of given thickness by a d.c. bias magnetic field of a predetermined magnitude oriented orthogonally with respect to the magnetic layer, the magnitude of the field determining the diameters of the cylindrical domains. The sustained domains may be propagated from location to location of the magnetic layer by means of, for example, appropriately energized magnetic loops located on the surface of the magnetic layer, the loops providing lateral field gradients in the plane of the magnetic layer which results in lateral forces acting on the walls of the domains effecting the desired propagation.

Another prior art domain propagation arrangement is to deposit permalloy metal film elements on the surface of the magnetic layer in, for example, the familiar T-bar and I-bar or Y-bar arrangements. In order to propagate the domains amongst the permalloy elements, a rotatable magnetic field is generated in the plane of the magnetic layer coupling with the permalloy elements to provide the lateral forces required to move the domains.

A variety of magnetic layer configurations are utilized in instrumenting the above described prior art devices. For example, a non-magnetic crystalline substrate is manufactured and a crystalline magnetic film epitaxially deposited thereon; the magnetic domains being generated, sustained, propagated and detected in the magnetic film. As another example, a plate of crystalline magnetic material may be grown and processed to provide the volume and surface associated with the generation and sustaining of the magnetic domains.

In the processes utilized in manufacturing the prior art magnetic domain devices, imperfections and defects are often introduced into the materials. For example, when the crystals are manufactured by the conventional high temperature solution technique or by known flux-melt processes, small particles from the crucible utilized as well as small voids are often included in the crystal. Additionally, defects in the form of strains and dislocations (i.e., slippage between crystal planes) are often introduced in these manufacturing processes.

As is well known, the crystals grown by these various prior art techniques are sliced and polished to provide surfaces on which further operations are performed. The conventionally utilized slicing and polishing operations often introduce additional crystal defects. In magnetic domain devices in which a crystalline magnetic film is epitaxially deposited on the sliced and polished surface of a non-magnetic crystal, the crystal structure of the magnetic film tends to follow that of the non-magnetic substrate. Thus defects in the substrate surface such as dislocations or strains, often cause similar defects in the deposited magnetic film which result in regions of high magnetic coercivity. It is appreciated that in the magnetic domain devices comprising a single crystal layer of magnetic material, imperfections and defects result in regions of high coercivity for reasons similar to those given above. It will be appreciated that although these regions of high coercivity may be localized in the magnetic material, it is usual that the regions are more or less uniformly distributed over the magnetic layer causing magnetic material to have a uniformly high coercivity.

In magnetic domain devices utilizing magnetic material having regions of high magnetic coercivity caused by defects as described above, the domains tend to be "pinned" on the defects such that a domain propagating magnetic field must be of sufficient magnitude to "unstick" the magnetic domains from the regions of high coercivity to which they are pinned. This so-called bubble stickiness caused by the defects often results in erratic domain motion where the domains become "caught" on the imperfections (regions of high coercivity). Such erratic motion often results in magnetic domains remaining stationary when they are supposed to move resulting in the generation of false data in data processing applications of the devices. It will be appreciated that the domain propagating circuits should provide a field gradient large enough to move the magnetic domains at all times despite the tendency of the domains to stick on defects. Propagating fields of smaller magnitude than that required to unstick the domains and place them in motion will not have a useful effect on the domains.

It is possible in the procedures utilized in the prior art for manufacturing the magnetic materials, to reduce the number and severity of the defects by instituting stringent quality control procedures thus providing higher quality crystals. For example greater care in the growth, slicing and polishing operations as well as a careful inspection and selection of crystals may provide magnetic materials through which the magnetic domains may be smoothly and readily propagated with a minimum of sticking on the defects. Such procedures tend greatly to increase the manufacturing costs of such devices as well as significantly to reduce the yield of suitably usable structures.

SUMMARY OF THE INVENTION

It is a primary object of the present invention to reduce the effects of the regions of high magnetic coercivity without instituting expensive manufacturing procedures thereby providing magnetic material through which the magnetic domains may be smoothly propagated, i.e., to apparently reduce the coercivity of the magnetic material.

It is a further object of the invention to utilize smaller magnitude domain propagation fields with material having regions of high coercivity than was heretofore possible.

These objects are accomplished by applying an alternating magnetic field transversely and preferably perpendicularly to the surface of the magnetic material causing a reduction in the domain pinning effect of defects in the magnetic material thereby apparently reducing the coercivity of the material.

BRIEF DESCRIPTION OF THE DRAWING

The sole FIGURE is a perspective representation of a portion of a typical magnetic domain device embodying the principal of the present invention.

DESCRIPTION OF THE PREFERRED EMBODIMENT

The present invention may be utilized with the large variety of magnetic domain devices that are known in the art, typical examples of which having been discussed above. For purposes of explanation, the invention will be described with regard to a magnetic domain device comprising a magnetic layer grown on a non-magnetic substrate. Referring to the sole FIGURE, the invention is illustrated exemplified in a magnetic domain device comprising a substrate layer 1 and an active magnetic domain storage and translating layer 2 having a common interface 3. The layer 2 has an upper surface 4 opposite the interface 3 which is normally associated with certain conventional domain excitation, propagation, and sensing elements. The magnetic domain storage or translating layer 2 may in a general manner be the site of any of various digital logic operations such as have been liberally described in patents and other technical literature such as the Bell System Technical Journal supra.

The sole FIGURE illustrates a magnetic domain device of general interest which incorporates the invention, and shows a configuration which represents only a fraction of a normally larger array assembly comprising an active magnetic domain storage or translating layer 2 and various conventional magnetic domain excitation, translation and sensing elements. The sole FIGURE may be considered to illustrate a shift register 5 utilizing the layer 2 of magnetic material. The general state of magnetization of the layer 2 is indicated by the minus signs indicating the magnetic lines of flux directed into the surface 4. Magnetic flux lines within magnetic domains and oppositely directed, are represented by plus signs, such as the plus sign 6 representative of a magnetic domain 6' within conductor loops 7 and 8.

Conductors 12, 13 and 14 under control of a conventional domain translater 9 may be affixed or in close proximity to the surface 4 of the magnetic domain layer 2 in a selected conventional manner. The conductors 12, 13 and 14 respectively couple to successive triads of conductive loops, such as the loops 8, 8*a*, 8*b* of a first such triad, etc., to form the familiar three-phase shifting register arrangement. An array of rows and columns of such multiple loop arrangements is often utilized in storage systems. The conventional d.c. domain sustaining magnetic bias field, represented by vector 15, is provided in any convenient manner such as by the use of conventional coil arrangements (not shown) which surround the dual layer configuration or by conventionally located permanent magnets. The magnetic domain sustaining bias field is poled oppositely to the polarization of the magnetic domains in a conventional manner.

The individual sizes of each loop 8, 8*a* or 8*b* are conventionally about the size of the cross-section of the stable cylindrical magnetic domain under representative circumstances so that any stationary domain is largely encompassed by an associated loop 8, 8*a*, 8*b* or the like.

The magnetic domains are generated or excited by a conventional domain exciter, as represented by exciter 20 associated with the loop 7 substantially coaxial with the loop 8. A stable cylindrical magnetic domain such as the domain 6' once formed in the conventional manner by the domain exciter 20 and loop 7 may be shifted in position in incremental steps from the location of the loop 8 to the position of the loop 8*a* then to the loop 8*b* and so forth by successive excitation of the conductors 12, 13 etc. by the domain translater 9. The circuits and excitations utilized in performing these functions are well known in the art and are described in numerous publications such as the Bell System Technical Journal supra. When the propagating magnetic domain reaches the loop 8*n* it may be read out by the loop 8*n* under control of a conventional domain sensor 21 in a known manner.

It will be understood by those skilled in the art that other digital logic functions are readily accomplished utilizing similar prior art techniques to those employed in the example of the shift register 5.

The term coercivity ($H_c$) of a magnetic domain material is defined in the technology and will be understood to be defined herein as the magnetic field required to "unstick" the domains from the pinning sites and place the domains in motion. As previously described, conventional methods of manufacturing the magnetic domain materials cause imperfections and defects which may be distributed throughout the material, these defects resulting in regions of high coercivity providing the domain pinning sites. Since minute defects resulting in numerous pinning sites are distributed over the magnetic materials, a coercivity may be associated with a sample of magnetic material in accordance with the above definition.

In the absence of the present invention, the behavior of bubble domains of diameter "*d*" has been described by A. J. Perneski in the IEEE Transactions on Magnetics, Vol. MAG-5, No. 3, pages 554–557. When a magnetic domain propagating field gradient is applied to the magnetic layer 2 from, for example, the translating circuit 9 via the loops 8, and the field gradient has a value less than approximately $(8/\pi)$ $(H_c/d)$, the magnetic domains remain stuck to the pinning sites and do not propagate. When the propagating field gradient equals approximately $(8/\pi)(H_c/d)$, the domains propagate but the motion is erratic because the domains get caught on the pinning sites.

In accordance with the present invention, an alternating magnetic field, represented by the vector 30, is applied transversely to the magnetic layer 2 of a magnitude to cause the diameters of the cylindrical magnetic domains, such as the domain 6', to pulsate or vibrate at the frequency of the alternating field 30. This field may be applied, for example, by a conductive loop 31 in the plane of the layer 2 connected to a source of a.c. potential 32. The vibration or pulsation of the domain walls tends to maintain the domains unstuck from the pinning sites such that only a small laterally oriented magnetic field gradient is required to move the domains. Thus it is appreciated that the applied a.c. field 30 has the desirable affect of apparently reducing the coercivity of magnetic domain materials which in the absence of the invention would exhibit high coercivity. Thus by utilizing the alternating magnetic field 30 of the present invention, materials that are manufactured reasonably economically by conventional procedures may be made to exhibit the low coercivities of materials that can presently only be manufactured by significantly more expensive careful manufacturing processes.

The effect of applying the alternating magnetic field 30 may be appreciated by observing the dynamic behavior of the magnetic domains as propagating fields are applied. The domains may be viewed in a conventional manner utilizing microscopic equipment and polarized light. In the absence of applying the alternating magnetic field 30, the motion of the domains is erratic, as previously mentioned; but with the alternating field 30 applied, the domain wall motion is observably smooth as the propagating field is varied.

The amplitude and frequency of the applied field 30 are not critical and may be selected experimentally for particular devices. In a specific arrangement, the parameters of the alternating magnetic field 30 may be selected to provide the smooth domain motion with small magnitude propagating fields. It has been ascertained that alternating magnetic fields with peak amplitudes slightly larger than the coercivity for a material sample will perform in an optimum manner in accordance with the invention. Optimum performance is also obtained when the frequency of the alternating magnetic field 30 is selected to be greater than the propagation rates of the domains being moved.

Utilizing typical magnetic materials and choosing the magnitude and frequency of the alternating magnetic field 30 as described above, the amplitude of the pulsation in magnetic domain diameter is very small such that the pulsation is not readily observable when the domains are viewed through typical microscopic apparatus. This domain diameter pulsation, however, produces the result that the slightest change in the propagating field will have a motive effect on the domains. Without the alternating magnetic bias 30, no propagating field gradient less than approximately $(8/\pi)(H_c/d)$ would effect the domains. Thus when utilizing the present invention, significantly smaller propagating magnetic fields may be utilized than with prior art arrangements providing a significant reduction in power dissipation.

The invention has been described above in terms of the alternating magnetic field 30 being applied transversely with respect to the layer 2. Although embodiments of the invention are operable when the field 30 is applied obliquely with respect to the layer 2, optimum performance may be expected when the field 30 is applied perpendicularly thereto.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. A magnetic domain device having a layer of magnetic material capable of sustaining and propagating magnetic domains, said material having domain pinning defects, and means for applying a magnetic domain propagating field at said layer for propagating said domains from position to position in said layer, the improvement comprising means for applying an alternating magnetic field transversely with respect to said layer of a frequency greater than the domain propagation rate from position to position for preventing said domains from sticking on said defects.

2. The device of claim 1 in which said means for applying said alternating magnetic field includes means for applying said field substantially perpendicularly with respect to said layer.

3. The device of claim 1 in which said magnetic material has a predetermined coercivity, and said means for applying said alternating magnetic field includes means for applying said field at a magnitude at least equal to said coercivity.

4. The device of claim 1 in which said means for applying said alternating magnetic field comprises a conductive loop in the plane of said layer, and means for coupling said loop to a source of alternating potential.

5. The device of claim 1 further including means for applying a d.c. magnetic domain sustaining field transversely with respect to said layer.

6. A method for unsticking magnetic domains in a layer of magnetic material of a magnetic domain device, said material having domain pinning defects, comprising the steps of applying a magnetic domain propagating field to said layer for propagating said domains from position to position in said layer, and applying an alternating magnetic field transversely with respect to said layer of a frequency greater than the domain propagation rate from position to position for preventing said domains from sticking on said defects.

7. The method of claim 6 in which said last mentioned step comprises the step of applying said alternating magnetic field substantially perpendicularly with respect to said layer.

8. The method of claim 6 in which said magnetic material has a predetermined coercivity and said last mentioned step comprises the step of applying said alternating magnetic field at a magnitude at least equal to said coercivity.

9. A magnetic domain device having a layer of magnetic material capable of sustaining and propagating magnetic domains, said material having domain pinning defects, and means for applying a magnetic domain propagating field at said layer for propagating said domains from position to position in said layer, the improvement comprising means for applying an alternating magnetic field transversely with respect to said layer of a frequency greater than the domain propagation rate from position to position and of an amplitude less than that causing vibration of the walls of said domains over a domain diameter change of 30 percent for preventing said domains from sticking on said defects.

10. The device of claim 1 in which said frequency is at least twice said domain propagation rate.

* * * * *